Nov. 23, 1926.  1,607,732
H. W. FLETCHER
MILLING TOOL FOR WELL DRILLING
Filed Oct. 1, 1926
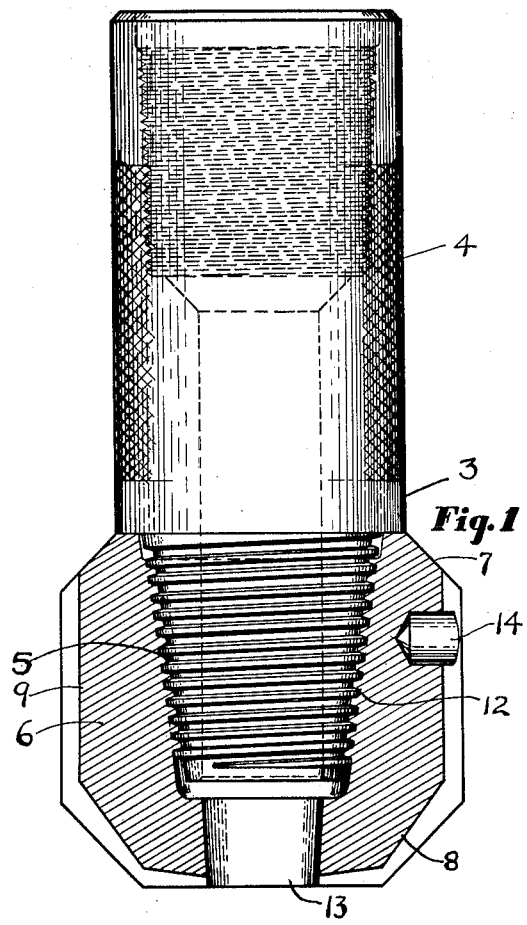
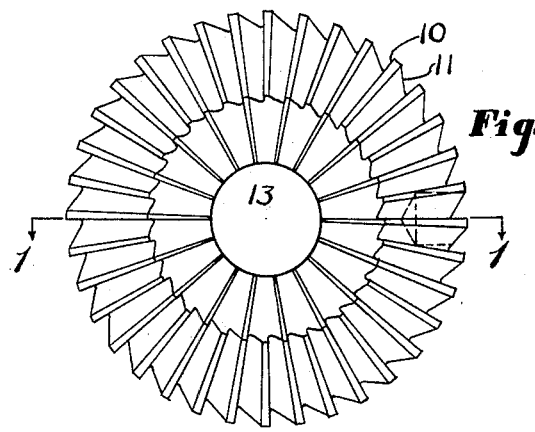
H. W. FLETCHER, INVENTOR.
BY Jesse R. Stone
ATTORNEY.

Patented Nov. 23, 1926.

1,607,732

UNITED STATES PATENT OFFICE.

HAROLD W. FLETCHER, OF HOUSTON, TEXAS.

MILLING TOOL FOR WELL DRILLING.

Application filed October 1, 1926. Serial No. 140,172.

My invention relates to milling tools for use particularly in operations connected with drilling deep wells for oil, gas, sulphur or water.

My invention finds application particularly where the well has been junked due to accident in handling the drill or the pipe in drilling, or pumping tools in pumping a well. In sch cases the bottom of the hole becomes filled with metal pipe, drilling tools, tubing, or other similar material and, when fishing operations have failed to remove the lost tools, it becomes necessary to go down into the hole with a milling tool and cut or grind up the metal into small enough pieces so that they may be washed out of the hole by the flushing fluid. Or the milling tool may be used to side track by jamming the junk to one side and cutting a new track beside it for the drill. The milling tools have toothed cutters usually made up of solid masses of hardened steel built to withstand severe use and to be resharpened when dull. They are hence costly to the driller and hard to manufacture properly.

The object of my invention is to construct a milling tool for deep wells which is light in structure and yet strong enough to withstand hard usage.

Another object is to provide a milling tool, the cutting portion of which may be quickly and easily removed from the head and a new one substituted.

This application is refiled for the previously abandoned application No. 516,611, filed Nov. 21, 1921.

Referring to the drawing herewith wherein like numerals of reference are used to designate like parts in both of the views, Fig. 1 is a side elevation of the head of my tool with the cutter thereon in central longitudinal section taken on a plane indicated by the line 1—1 of Fig. 2. Fig. 2 is a bottom plan view thereof.

The tool is simple in construction, having an upper tubular head 3 of steel. This head is preferably knurled at 4 on the outer surface to provide a rough surface for the wrench to take hold. It is cylindrical in general outline having a lower tapered end, or pin 5 thereon, threaded to connect with a cutter 6. The head has a central passage 7 therein for the flushing fluid. The upper end of this passage is enlarged and internally threaded at 8 to receive the drill stem, not shown.

The cutter 6 is of larger diameter than the head and has a cylindrical periphery 9 except for tapered upper and lower ends 7 and 8 respectively. The outer surface is toothed longitudinally of the cutter, the teeth having a sharp forward edge 10 presented in the direction of rotation and an inclined back face 11 in the usual form of construction for such tools. The central upper end has a comparatively large recess 12, threaded to receive the lower pin 5 of the head. When thus assembled the pin 5 forms about one-half the diameter of the head. Below the recess 12 there is an opening 13 to allow passage for the flushing fluid.

To provide means to quickly release the cutter from the head, I have formed a radial opening 14 at one side of the cutter to receive a bolt or pin, not shown, against which a hammer may be used to jar the cutter loose from the head.

It will be noted that a milling tool thus formed will be strong enough to withstand the usual severe strain to which it will be subjected. The cutting portion is light and strong. It may be made of soft steel and, after the teeth have been formed, may be hardened by carbonizing. This furnishes a tough ductile interior and hardened cutting surface. The central pin 5 of the head is also of hardened steel and the tool will withstand the heavy duty as will the present massive type of milling tool. By making the central pin of hardened steel, it will be noted that when it is firmly screwed within the cutter it will reinforce the same so that I will have in effect an outer hardened steel cutting area backed by a ductile layer, which in turn is reinforced by the hardened steel pin; thus obtaining an exceptionally strong tool. By thus forming the cutting portion the process will be greatly cheapened and it will be possible to use one cutter until it is dull and then throw it away and use a new one. This is an important improvement from the drillers' standpoint and its advantages will be clear to one skilled in the art without further description.

What I claim as new and desire to protect by Letters Patent is:

A milling tool comprising a cylindrical head, a lower shoulder thereon, a relatively hard tapered pin below said shoulder, a cutter having a relatively wide tapered and threaded socket therein for said pin of substantially the same length as the pin, said socket being open at its rearward end and extending substantially to the forward end of the cutter; longitudinal cutting teeth on the periphery and forward end of said cutter, said cutter having a relatively hard exterior and a tough and ductile interior.

In testimony whereof I hereunto affix my signature this 13th day of September, A. D. 1926.

HAROLD W. FLETCHER.